United States Patent Office 2,920,882
Patented Jan. 12, 1960

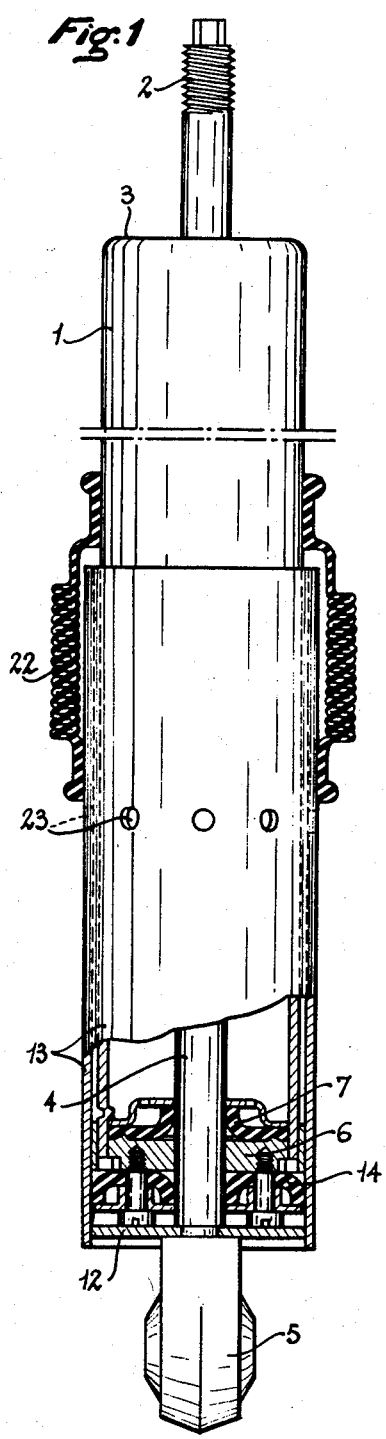
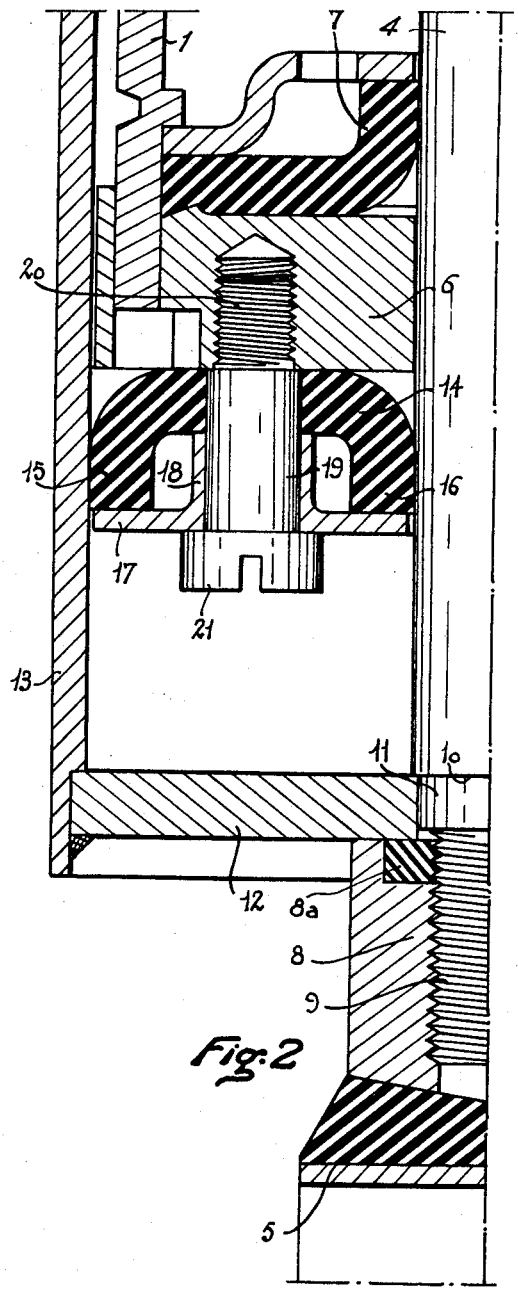
Fig. 1
Fig. 2

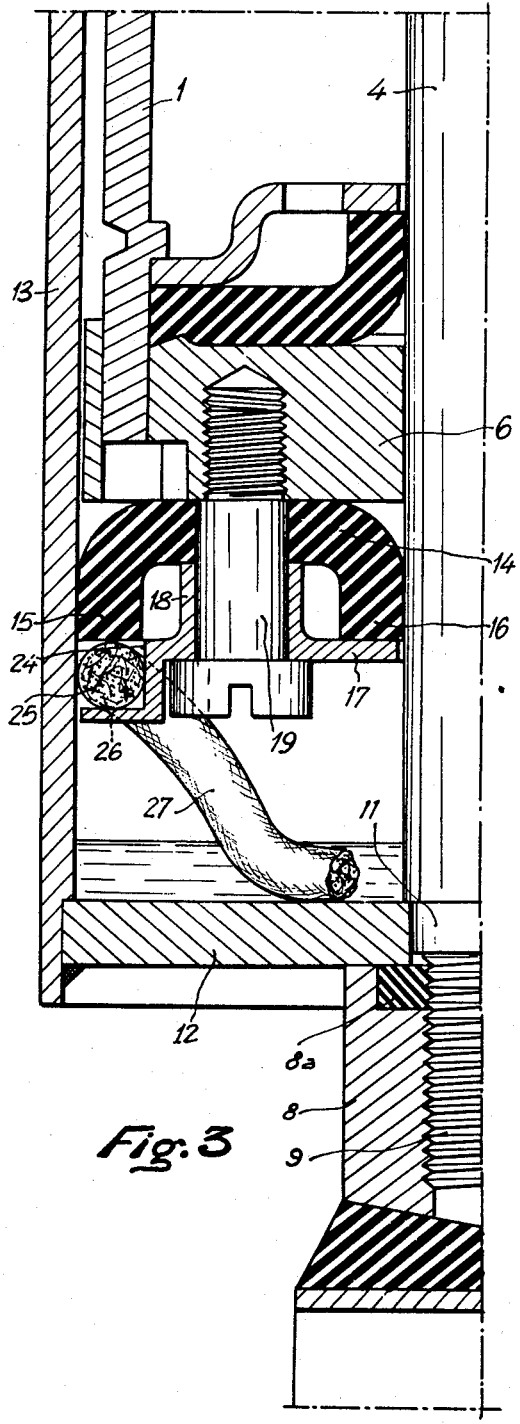
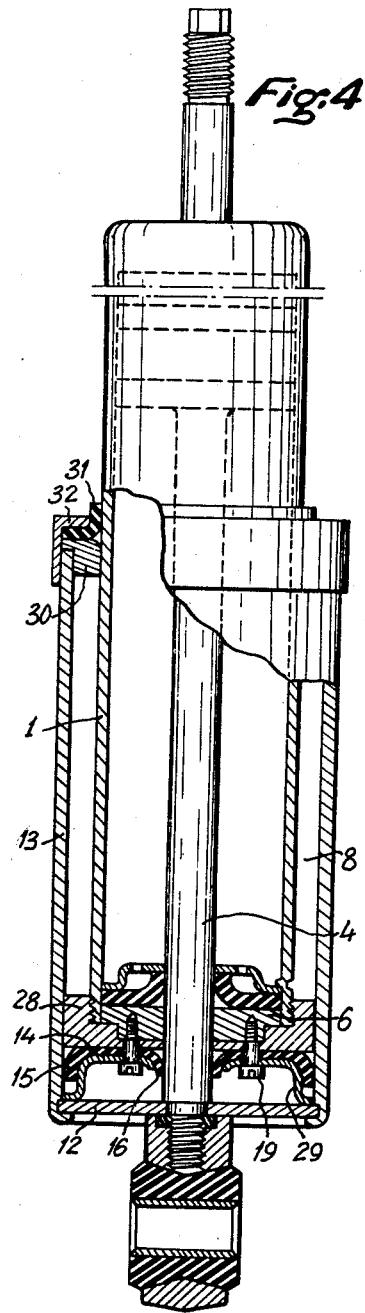
Fig. 3
Fig. 4

2,920,882

DEVICE FOR CORRECTING THE RIGIDITY OF A SUSPENSION SYSTEM COMBINED WITH A SHOCK-ABSORBER

Fernand Stanislas Allinquant, Paris, France, assignor to Societe Anonyme: Etablissements Allinquant, Paris, France Application July 8, 1958, Serial No. 747,178

Claims priority, application France July 19, 1957

1 Claim. (Cl. 267—8)

In order to keep the frequency of oscillation of an automobile suspension system within the limits which correspond to comfort, it has been proposed to apply a corrective to the rigidity of the suspension springs in order that this rigidity may vary in a manner substantially proportional to the load which the vehicle is to carry. By interposing a pneumatic member between the chassis of the vehicle and the suspended axle, in other words in parallel with the suspension spring, the result is obtained that the total rigidity of the suspension is equal to the sum of the constant rigidity of the spring and of the variable rigidity of the pneumatic member, which increases with the load. A suitable device for putting the pneumatic member in communication with atmosphere in the "no-load" position of the vehicle suspension when stationary, causes this corrective to act only after the loading of the vehicle has caused the suspension to yield beyond the no-load position.

In addition to the elastic means of suspension on a vehicle, there are always provided at the present time shock-absorber devices associated with these means, and having the function of limiting the amplitude and the duration of the oscillations. The shock-absorber in most general use is the telescopic hydraulic shock-absorber mounted in parallel with each suspension spring.

The present invention has for its object the combination with a shock-absorber of this type of a pneumatic device having the functions of correcting the rigidity of the spring suspension, in accordance with the operative method referred to above. To this end, and in accordance with an essential feature of the invention, a pneumatic cylinder is constituted by a cylindrical sleeve provided with an end portion fixed to the outer extremity of the piston-rod of the shock-absorber cylinder and sliding over the cylinder of the shock-absorber, the base of this latter being provided with a fluid-tight joint with this sleeve and with the piston-rod, which ensures the fluid-tightness of the pneumatic cylinder thus formed, and this pneumatic cylinder contains air which, in the mean position of extension of the shock-absorber is substantially at atmospheric pressure.

The invention will be described in the text which follows with reference to the accompanying drawings which show forms of embodiment of the invention by way of example, and in which:

Fig. 1 shows a first form of embodiment of a combined shock-absorber in accordance with the invention, in the position of maximum compression, shown in side elevation with partial cross-section of the portion which forms the pneumatic cylinder;

Fig. 2 shows to a larger scale in axial half-cross-section, the extremity of the shock-absorber comprising the pneumatic cylinder in accordance with Fig. 1;

Fig. 3 is a view similar to that of Fig. 2 of a modification of the pneumatic cylinder shown in this latter figure;

Fig. 4 is a view similar to that of Fig. 1 of another form of embodiment of a combined shock-absorber in accordance with the invention.

The telescopic hydraulic shock-absorber shown is of known type working with oil, and comprises (see Fig. 1) a cylinder 1 provided with a fixing rod 2 secured to its full end, and a piston (not shown) the rod of which terminates in the attachment member 5 and passes through the opposite end 6 of the cylinder which is provided with a known type of fluid-tight joint 7.

In accordance with the invention, a pneumatic cylinder is combined with the shock-absorber in the manner shown in Fig. 2. The attachment member 5 is fixed to the end of the piston rod 4 by a threaded sleeve 8 engaged on the threaded end of this rod and clamps against a shoulder 10 forming a cylindrical bearing surface 11, a full disc 12 which forms the bottom of the pneumatic cylinder, a resilient packing ring 8a being placed between the sleeve 8 and the disc 12 so as to seal the passage of the piston rod 4. To the periphery of this full disc is welded the extremity of a cylindrical sleeve 13 forming the lateral wall of this cylinder and surrounding with a small clearance space the cylinder 1 of the shock-absorber over slightly more than half its length (see Fig. 1) when the shock-absorber is in the position of maximum compression, that is to say when the bottom 12 is closest to the end 6.

On the base 6 of the shock-absorber, through which the piston rod 4 passes in a fluid-tight manner, is mounted a fluid-tight joint between the sleeve 13, the lateral wall of the pneumatic cylinder, and this end 6, which constitutes a piston in a manner of speaking. This joint is formed by a rubber washer 14 having external and internal diameters in the free state sufficient to form by toroidal deformation an external lip 15 which bears against the sleeve and an inner lip 16 which is formed against the rod. It is held in position by a flat metal washer 17 supported against the front section of the two lips 15 and 16 and carrying on its inner face a certain number of bosses 18 distributed along the circumference and having a height corresponding to that of the lips. Screws 19 with cylindrical shanks are passed into a hole pierced in each boss and are screwed in alignment with the central portion of the rubber washer 14 by a threaded end 20 of reduced diameter, into the bottom 6, and by the contact of their heads 21 with the washer 17, these screws retain the joint in its normal state of deformation. The fixing of the joint thus prevents any additional deformation which might be caused by friction against the sleeve during the course of extension movements of the shock-absorber and therefore of the pneumatic cylinder. By its deformation, the rubber washer is thus always in the intended state of internal stress which is suitable to provide fluid-tightness against the sleeve and against the rod, which is ultimately the desired fluid-tightness of the pneumatic cylinder.

The extremity of the sleeve 13 round the cylinder 1 of the shock-absorber (see Fig. 1) is located inside an accordion tube member of rubber 22 of the usual type, one extremity of which is clamped on the sleeve 13 and the other on the cylinder 1 beyond the position which the end of the sleeve may reach. On the other side of this accordion member, the sleeve is pierced with a ring of holes 23 which put the space between the sleeve 13 and the cylinder 1 into communication with the open air, since the outlet of this space is covered by the accordion tube 22. The interior of the accordion tube is thus always in communication with free air, which prevents it from being flattened during the extension movements of the shock-absorber. These holes 23 have however another object which is actually their main object. In the mean position of extension which corresponds, in the shock-absorber mounted on the vehicle, to the no-load position of the suspension, they have just passed over the outer lip 15 of the joint and then put the pneumatic cylinder into communication with atmosphere.

The operation of the device will be immediately deduced from the description which has already been given. When the vehicle is stopped without load, the shock-absorber being in its mean position of extension, the pneumatic cylinder is at atmospheric pressure. As soon as the vehicle is loaded, the yielding of the suspension results in a reduction in length of the shock-absorber and the holes 23 pass over the lip 15 of the joint which hermetically isolates the pneumatic cylinder. The air which is thus enclosed in this cylinder is subjected to a compression proportional to the load, which results in the application of a pneumatic suspension in parallel with the spring suspension. It is the total rigidity of both these systems which intervenes in the movements of oscillation, which are furthermore damped by the hydraulic shock-absorber, so that the constancy of the rigidity of the spring suspension is corrected by the increase in rigidity of the pneumatic suspension in conformity with the object stated.

The corrective effect is limited by the relative longitudinal position of the holes 23 which put the pneumatic cylinder to atmosphere. For the position indicated above, this corrective effect ceases when the extension of the shock-absorber passes beyond the unloaded position during rebounding movements of the suspension; it is restored as soon as the holes 23 again pass over the lip 15 in a movement of compression during the following half-period. For this reason, the expansion force of the suspension is not increased for rebounding movements (dropping of the wheel into a hole in the road); on the contrary, it increases on the one hand with the load and on the other hand with the compression of the shock-absorber. In the limit, the compressed air cushion contained in the pneumatic cylinder acts as a flexible limiting abutment for the compression travel.

The combined device which has just been described has the advantage of adding to the shock-absorber, forming a separate whole as an accessory of the suspension, the corrective means for the rigidity of the suspension springs, while the shock-absorber remains unchanged. This constitutes a substantial simplification from the point of view of construction, while at the same time it ensures good operation.

It is clear that the relative longitudinal positions of the holes which put the pneumatic cylinder to free air may be chosen so as to cause the pneumatic suspension to come into action slightly before or slightly after the no-load position of the suspension, depending on the effect which it is desired to obtain. In addition, the means for communicating with free air need not necessarily be the ring of holes described, although this constitutes a particularly simple and economical solution; any valve device would form an equivalent to this arrangement. In this respect, there should be indicated a possible alternative form of construction, according to which the ring 23 of holes described is arranged, not outside the accordion tube 22, but in a zone of the sleeve 13 which is enclosed inside the said tube. During the course of operation, the pneumatic device draws-in and expels the air contained in the tube, which thus forms a reservoir of air for the device. Under these conditions, the device "breathes" air which is kept free from contact with all dust, which is obviously favourable to good working and long life of the pneumatic suspension.

In order to ensure lubrication of the fluid-tight joint 14, a small quantity of oil can be introduced during assembly into the bottom of the sleeve 13. In order to ensure continuity of lubrication, it is however preferable to provide a special lubricating device according to the modification shown in Fig. 3. The washer 17 which retains the double-lipped toric joint 14 described with reference to Fig. 2 is then shaped at its peripheral portion so as to form an annular housing 24 for a wick 25. This wick is arranged in a loop in this housing and passes out towards the interior and downwards through a hole 26 with a hanging end 27 which is long enough for its extremity to dip into a reserve of oil located in the bottom 11 of the pneumatic cylinder, in which it is placed during the assembly of the device.

This arrangement, which ensures a constant state of lubrication of the outer lip 15 of the joint 14 by the oil drawn-up into the wick by capillary action, has the effect not only of reducing the friction of the sleeve against this lip, but also of facilitating its function as a fluid-tight sealing member.

The form of construction previously described has however a drawback due to the exchanges which take place directly with the exterior through the holes 23 of the sleeve if they open outside the protecting tube 22, or if these holes open into the interior of this tube, through the intermediary of the reservoir of air, the fluid-tightness of which is not ensured, the depression existing in the annular space facilitating the intake of air along the contact surfaces of the protecting tube. Humidity and dust which are thus brought in by the outer air into the annular space give rise to condensation and to deposits, the result of which is that the wall of the sleeve has a surface condition which adversely effects the fluid-tightness of the lip joint of the pneumatic chamber and which, in course of time, prevents the correct operation of the device.

In accordance with the form of construction shown in Fig. 4, the isolation of the annular space between the shock-absorber tube and the sleeve is effected by mounting on the latter, at its outlet, a lip joint directed towards the exterior and sliding on the wall of the shock-absorber tube. The depression which exists in the annular space enclosed by two joints, the lips of which are directed towards the exterior, assists the fluid-tightness of the joints; this space is thus isolated, and the inner surface of the sleeve is protected from any deposit of moisture or dirt which would interfere with the sealing effect of the joint of the pneumatic chamber.

In the form of construction according to Fig. 4, the sleeve 13 is guided by a ring 28 screwed against the bottom 6 on the end of the shock-absorber, and the joint 14 is held by an annular armature 29 fixed to the bottom 6 by screws 19, which protects the lip 15 and limits the travel of the bottom 12 to which it serves as an abutment. The sleeve 13 carries at its outlet a guiding ring 30 which slides on the wall of the tube 1 and which serves as a support for an annular joint with an external lip 31, retained by a ring 32 driven tightly on the outlet of the sleeve.

The assembly of the lip joint 31 at the extremity of the sleeve is carried out in the extended position of the shock-absorber while the pneumatic chamber is at atmospheric pressure. The compression of the shock-absorber thus ensures an increase in length of this annular space which is thus normally under depression. This depression is favourable to fluid-tightness, since the outer lips 31 and 15 of the joints are applied against their sliding surface on the sleeve and on the tube, the first by a pressure which is at its minimum value equal to atmospheric pressure and which increases in the inverse ratio of the travel during the course of compression of the shock-absorber, and the second by atmospheric pressure. The fluid-tightness of the joints is thus ensured; the annular space is isolated, and no ingress of outside air can take place. For this reason, the inner surface of the sleeve always remains clean and the lip joint 16 is perfectly applied on this surface, which ensures the fluid-tightness of the pneumatic chamber and the good operation of the device. In addition, lubrication of the internal wall of the sleeve can be provided by the means described with reference to Fig. 3.

It is true that the portion of the shock-absorber tube on which the joint 31 slides is not protected. On the one hand however, its high position puts it in relative shelter from projections from the road, and on the other hand, water cannot remain either on this portion which is swept by the joint 31, or on this joint itself which is strongly forced against the tube and prevents all infiltration of moisture.

I claim:

A device to be associated with a suspension spring in a vehicle suspension system for damping the suspension and for correcting the rigidity of the suspension spring, comprising in combination, a hydraulic telescopic shock-absorber having a hydraulic cylinder closed and formed with attaching means at one end and provided with an apertured bottom with an inner joint at the other end, a piston within said cylinder, a piston rod fixed to said piston, fluid-tightly passing through said inner joint and formed with attaching means at its outer end, a pneumatic cylinder having a bottom fixed to an outer portion of said rod and an open cylindrical wall adapted to receive said hydraulic cylinder as a piston, an accordion tube between said cylindrical wall and the closed end of said hydraulic cylinder, a peripheral joint between said apertured bottom and said cylindrical wall, and openings through said cylindrical wall at a position corresponding to said peripheral joint for the mean position of extension of said shock-absorber.

References Cited in the file of this patent

UNITED STATES PATENTS

| | | |
|---|---|---|
| 949,833 | Mueller | Feb. 22, 1910 |
| 1,351,843 | Dunn | Sept. 7, 1920 |
| 1,723,010 | Brump | Aug. 6, 1929 |
| 2,149,040 | Binder et al. | Feb. 28, 1939 |
| 2,212,259 | Binder | Aug. 20, 1940 |
| 2,249,530 | Kollsman | July 15, 1941 |
| 2,333,096 | Dowty | Nov. 2, 1943 |
| 2,431,716 | Weseige | Dec. 2, 1947 |
| 2,506,726 | Magrum | May 9, 1950 |
| 2,531,368 | Tack et al. | Nov. 21, 1950 |